(12) United States Patent
Koeppe et al.

(10) Patent No.: US 8,410,421 B2
(45) Date of Patent: Apr. 2, 2013

(54) DETECTOR SURFACE CONSTRUCTED FROM ONE OR A PLURALITY OF PLANAR OPTICAL WAVEGUIDES

(75) Inventors: Robert Koeppe, Linz (AT); Richard Ebner, Wels (AT)

(73) Assignee: Isiqiri Interface Technologies GmbH (AT)

( * ) Notice: Subject to any disclaimer, the term of this patent is extended or adjusted under 35 U.S.C. 154(b) by 110 days.

(21) Appl. No.: 13/143,679

(22) PCT Filed: Jan. 4, 2010

(86) PCT No.: PCT/AT2010/000001
§ 371 (c)(1),
(2), (4) Date: Jul. 7, 2011

(87) PCT Pub. No.: WO2010/078609
PCT Pub. Date: Jul. 15, 2010

(65) Prior Publication Data
US 2011/0266423 A1    Nov. 3, 2011

(30) Foreign Application Priority Data

Jan. 7, 2009 (AT) .................................. A 18/2009

(51) Int. Cl.
*G01B 9/10* (2006.01)
(52) U.S. Cl. ................... 250/227.31; 250/216; 385/129; 385/131; 345/175
(58) Field of Classification Search ............. 250/227.11, 250/227.2, 227.31, 227.32, 208.2, 214 R, 250/216, 214.1; 385/14, 15, 116, 129–132; 345/173, 174, 175, 176
See application file for complete search history.

(56) References Cited

U.S. PATENT DOCUMENTS

| 5,005,979 | A | 4/1991 | Sontag et al. |
| 6,141,465 | A * | 10/2000 | Bischel et al. ................. 385/4 |
| 2006/0279558 | A1 * | 12/2006 | Van Delden et al. ......... 345/176 |
| 2007/0052684 | A1 * | 3/2007 | Gruhlke et al. ............... 345/173 |
| 2007/0152985 | A1 * | 7/2007 | Ostergaard et al. .......... 345/176 |
| 2007/0176165 | A1 | 8/2007 | Forrest et al. |
| 2011/0115750 | A1 | 5/2011 | Ebner et al. |
| 2012/0120027 | A1 * | 5/2012 | Ebner ........................... 345/175 |

FOREIGN PATENT DOCUMENTS

| DE | 2952608 A | 7/1981 |
| DE | 3413372 A1 | 10/1985 |
| DE | 3511757 A1 | 10/1986 |

(Continued)

OTHER PUBLICATIONS

International Search Report for PCT/AT2010/000001 with English translation, Both completed by the European Patent Office on Apr. 15, 2010, 6 Pages altogether.

*Primary Examiner* — Francis M Legasse, Jr.
(74) *Attorney, Agent, or Firm* — Brooks Kushman P.C.

(57) ABSTRACT

A detector surface which is based on optical signals and arranged as a flexible enveloping surface around the body in order to detect whether and where the illuminated indicator strikes the body. The detector surface composed of one or more planar optical fibers, wherein at least one layer of a planar optical fiber has photoluminescent properties, and wherein photodetectors are arranged on the planar optical fiber such that they can decouple light from the optical fiber and detect it. The planar optical fiber is designed as a film made of a transparent polymer having a thickness of 30 to 500 μm and the photodetector is arranged at a distance from all edges of the optical fiber on the optical fiber.

12 Claims, 4 Drawing Sheets

FOREIGN PATENT DOCUMENTS

Figure 1:
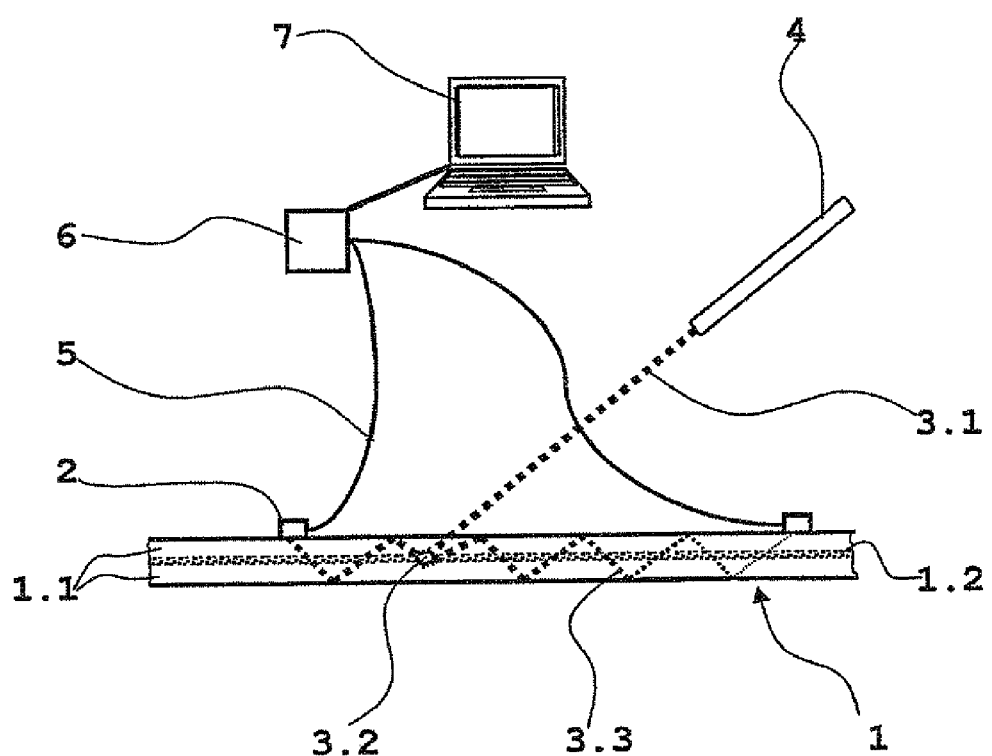

| | | | |
|---|---|---|---|
| DE | 4239389 | A1 | 5/1994 |
| EP | 0225625 | A2 | 6/1987 |
| EP | 0354996 | A2 | 2/1990 |
| WO | 2010006348 | A1 | 1/2010 |

* cited by examiner

DETECTOR SURFACE CONSTRUCTED FROM ONE OR A PLURALITY OF PLANAR OPTICAL WAVEGUIDES

CROSS-REFERENCE TO RELATED APPLICATION

This application is the U.S. national phase of PCT Appln. No. PCT/AT2010/000001 filed Jan. 4, 2010 which claims priority to Austrian application A 18/2009 filed Jan. 7, 2009, the disclosures of which are incorporated in their entirety by reference herein.

The present invention relates to a detector surface which can be arranged as a flexible enveloping surface around or on a body in order to detect whether and where a luminous pointer strikes the body.

The most important application at the present time is the detection of hits in combat simulations or combat games in which, instead of firearm simulation devices which fire something material such as a dye or a soft foam rubber ball, use is made of luminous devices which emit a collimated light pulse.

US 2007/0176165 A1 discloses a design for a position detector for an impinging light spot, said position detector being constructed in a planar fashion and being based on light-sensitive organic semiconductors. The detector constructed in a planar fashion forms a single large-area sensor cell. It consists of a plurality of layers, at least one layer of which is photoactive. At its edge, the position detector is provided with connection electrodes which are spaced apart from one another and by means of which an electrical signal can be tapped off, from which the location at which a light beam impinges is deduced. By comparison with a design comprising many individual light-sensitive cells arranged alongside one another, the arrangement is more cost-effective and simpler in its construction, but it offers less resolution.

US 2007 0152985 A1 presents an optical touchpad embodied as a planar optical waveguide. An object which is in contact with the waveguide of the touchpad couples in light from an external source into the waveguide of the touchpad by means of scattering at the surface of the object. The detection of the coupling-in location is made possible by a photoelectric detector, which is not described in greater detail.

The documents DE 42 39 389 A1, EP 354 996 A2 and EP 225 625 A2 describe optical position measuring devices in which fluorescent molecules are arranged on or in a surface which effects optical waveguiding, which molecules convert externally impinging light into longer-wave, diffusely scattered light, which is guided in the surface which effects optical waveguiding toward the surface edges thereof and is either already detected there in terms of its intensity by sensors or is only detected at a different location to which it is guided via optical waveguides. Since the intensity of the measured light decreases with the distance from the point of impingement of the light beam, the point of impingement of the light beam can be deduced by combining the measurement results from a plurality of sensors. By comparison with the above-described method in which the impinging light is guided without conversion in the waveguide to the sensors, it is advantageous that the signal is less dependent on the angle at which the light beam impinges on the surface. The use of this principle for an input device of a data processing system is not envisaged in said documents. Moreover, the position resolution is not good enough for that purpose in the case of relatively large surfaces, since the detectors are fitted at the edge of the waveguide in the present documents.

DE 2952608 A1 proposes a training suit equipped with a multiplicity of approximately point-type optical sensors, typically photodiodes, spaced apart from one another. The training suit serves, in combat simulation exercises or combat simulation games, to indicate if the person wearing the training suit has been "hit". The firearm simulation devices used in this case are devices which can emit temporally short, directed laser light pulses in a targeted manner. For registering hits, the individual sensors are connected to a data processing system.

For reasons of costs and handling, in this case the clothing surfaces are not equipped with photoelectric sensors in a surface-covering fashion, but rather only with an arrangement with a relatively coarse spacing pitch. In order that a hit is reliably detected, the laser light pulse has to be greatly expanded, as a result of which, under certain circumstances, hits are also indicated even though the pulse was aimed just beside the target person.

DE 34 13 372 A1 describes back in 1985 a target by which the location at which a light spot impinges is detected and read into a data processing system. A layer which comprises fluorescent molecules and can guide light waves in the layer is arranged on the front side of the rigid target. A photodetector is fitted to an edge of the layer, said photodetector detecting light which arose as a result of fluorescence and is guided in the layer. Since the intensity of the light guided in the layer decreases with the distance from the point of impingement, the distance of the point of impingement of the light spot on the layer can be deduced from the intensity of the light detected at a photodetector. If the position detector is arranged at the inner edge of an annular layer which effects optical waveguiding, the radial distance of the point of impingement of the light spot from the position detector can be calculated back from the measured signal strength. In one advantageous further development, the light-guiding surface is divided into elongate strips of constant width which are separated from one another with regard to light guiding. In this case, a respective photodetector is fitted to each longitudinal end of a strip. From the magnitude ratio of the light intensities measured at both photo-detectors of a strip, the location of impingement of a light spot at the strip can thus be calculated back well even when the absolute magnitude of the light energy introduced into the luminescence waveguiding at the point of impingement is not known. By comparison with the design in accordance with DE 2952608 A1 described above, it is advantageous that detection can thus be effected "in an area-covering fashion". What is disadvantageous is that hitherto it has only been applicable to rigid detector surfaces.

The object on which the invention is based is to provide a detector surface which can be arranged as a flexible enveloping surface around a body and which, in a manner that can be processed further for a data processing system, can detect whether and where a light spot impinges on the detector surface "in a surface-covering fashion" like the design in accordance with DE 34 13 372 A1, rather than only in a punctiform fashion like the design in accordance with DE 2952608 A1.

The object is achieved by proceeding, as in DE 34 13 372 A1, from a design in which the detector surface is a planar optical waveguide, in which photo-luminescent particles are integrated and on which one or a plurality of photoelectric sensors—furthermore designated as "photodetector" for short—are fitted, which are able to couple out light from the waveguide mode and to thereby generate an electrical signal, the strength of which is dependent on the the intensity of the light coupled out at the photodetector. The signal is transmitted to a data processing system. The latter can identify the strength of the signal and—in the case where a plurality of photodetectors are used—from which photodetector said signal originates.

In contrast to the known design, the planar optical waveguide is not embodied in a rigid fashion, but rather as a flexible film. For this purpose, the planar optical waveguide is formed from a transparent polymer having a layer thickness of 20 to 500 μm. (The term "transparent polymer" within the meaning of this description and the following claims is taken to mean and encompasses "transparent polymer mixtures" as well.)

In a further contrast to the known design, the photo-detectors are not or not only arranged on the edge of the surface of the optical waveguide, but rather primarily also on surface regions which lie at a distance from all edges.

In one particularly preferred embodiment, a photo-detector is arranged in a recess of the optical waveguide, said recess being formed by a forming process such as thermoforming or embossing in the otherwise flat film.

With regard to the surface assignment of waveguide surface to individual photodetectors, two basic types—which, however, can be combined with one another—can be differentiated:

In accordance with the first principle, the entire detector surface is formed by a multiplicity of individual smaller planar optical waveguides which geometrically adjoin one another, but are separated from one another with regard to the waveguiding. Each optical waveguide is provided with precisely one photo-detector. The latter only ascertains whether or not a light beam struck the respective optical waveguide. It does not need to supply information concerning at which partial surface of the optical waveguide precisely the relevant partial detector surface was struck.

In accordance with the second principle, the entire detector surface can be realized as a single continuous optical waveguide. This optical waveguide has a multiplicity of small-area photodetectors at a pitch distance from one another. Depending on how near individual photodetectors are to the respective coupling-in point of light into the waveguide, their measured signal has a different strength. The coupling-in point can thus be calculated back from the amplitude of signals of a plurality of photodetectors whose position on the waveguide is known.

The first principle is more robust and leads to simpler evaluation electronics and simpler data processing. In accordance with the second principle, a finer resolution can be obtained without an increase in costs.

The combination of the two principles consists in the fact that the entire detector surface is subdivided into a plurality of planar optical waveguides, at least some optical waveguides of which are equipped with more than one photodetector for the purpose of finer resolution. This can serve, for example, for a greater mechanical load-carrying capacity and simpler shapeability.

The invention is illustrated with reference to drawings.

FIG. 1: shows symbolically the essential elements of the second principle. The detector surface itself is schematically depicted in a manner not to scale in cross-sectional view, and light beams are symbolized by dotted lines.

Figure 2:
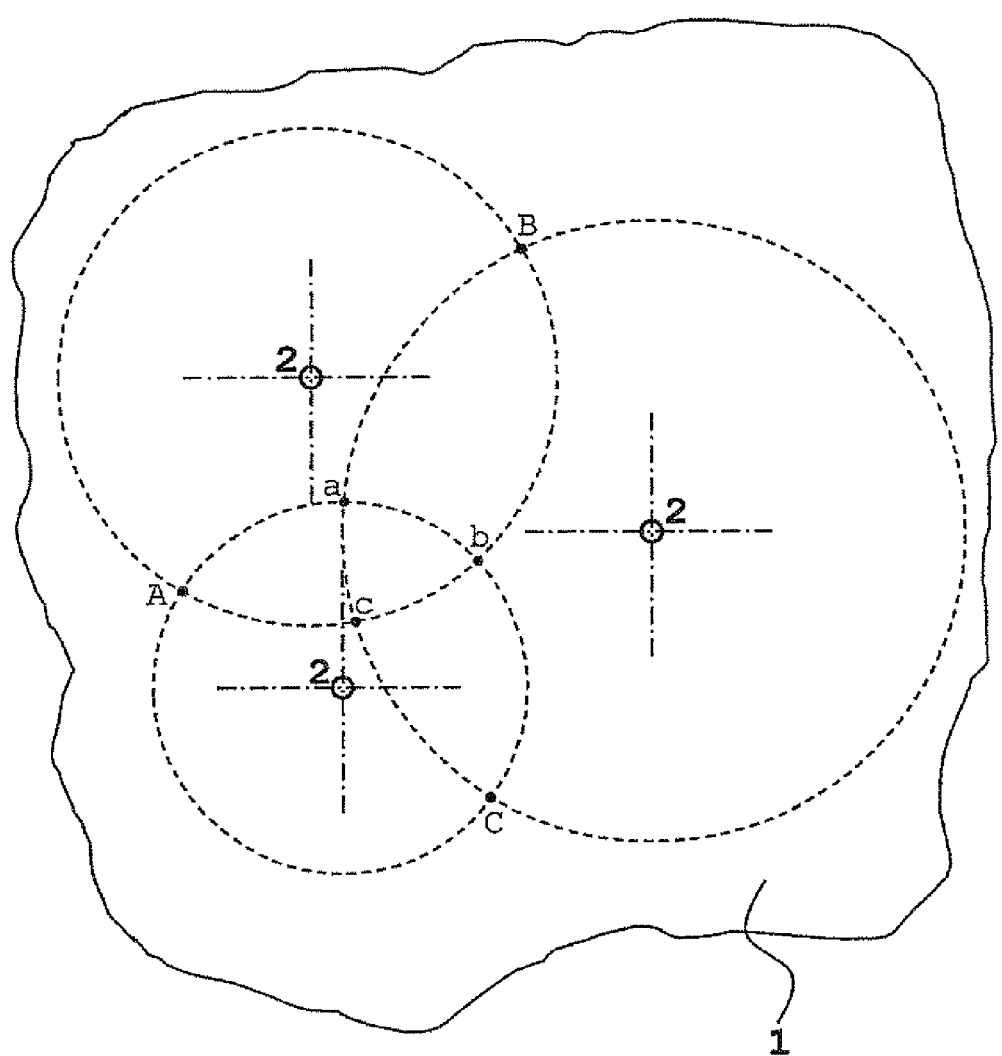

FIG. 2: is a frontal view of an excerpt from a detector surface according to the invention.

Figure 3:
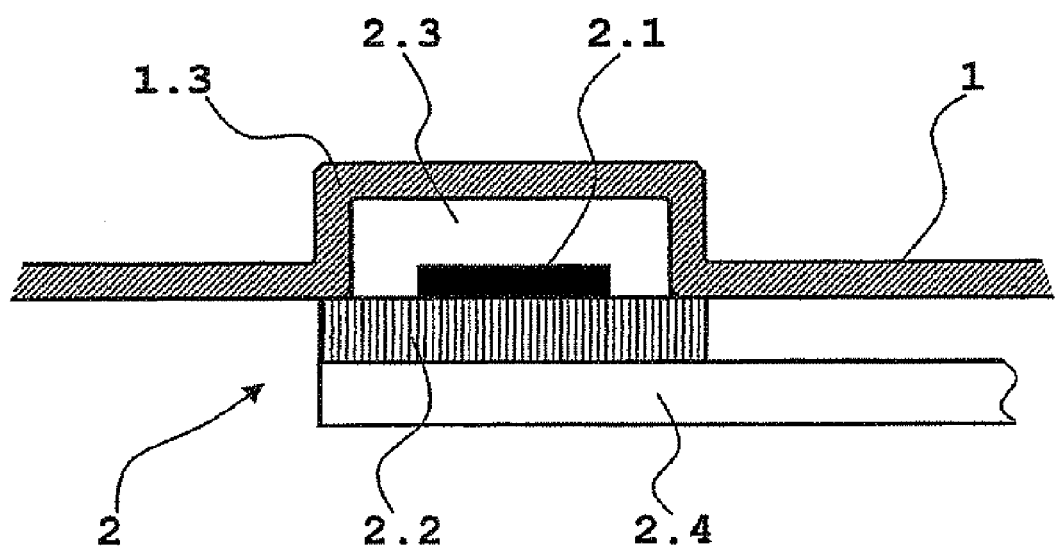

FIG. 3: is a partial sectional view of an excerpt from a detector surface embodied in a particularly advantageous fashion.

Figure 4:
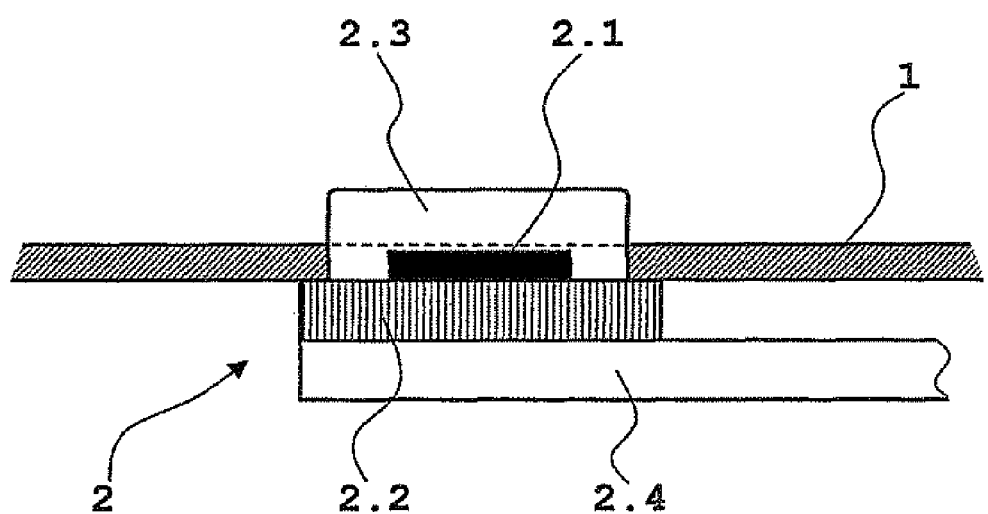

FIG. 4: is a partial sectional view of an excerpt from a further detector surface embodied in an advantageous fashion.

The planar optical waveguide 1 whose construction is depicted schematically in FIG. 1 consists, for example, of two covering layers 1.1 composed of PET and having a thickness of approximately 0.1 mm, between which is laminated a layer 1.2 having a thickness of approximately 0.001 mm and composed of a homogeneous mixture of the plastic polyvinyl alcohol and the dye Rhodamine 6G. The layer 1.2 is photoluminescent. It is of sufficient thickness that its absorption for light having a wavelength of 532 nm that impinges thereon normally is above 80%. (The layer thickness required for this purpose can best be determined by experiment.)

If a light spot with an appropriate spectrum impinges on the layer 1.2, then it initiates photoluminescence at the dye particles of the layer 1.2. Diffusely scattered, longer-wave light arises in this case. In accordance with the known underlying functional principle of optical waveguiding, it propagates in the transparent layers 1.1 and substantially also remains in said layers, that it is reflected back into the material of the layers 1.1 at the interfaces with the surroundings (air) on account of the different refractive index.

For example in a square grid having a period length of 5 cm, photodetectors 2 that occupy a cross-sectional area of approximately 2×2 mm$^2$ are fitted on the exposed side of one of the two PET layers 1.2 in such a way that they couple out light from the PET layer and couple it in at their pn junction. The signals of all the photodiodes 2 are fed via electrical lines 5 and a frequency filter 6 to a data processing system 7, in which they are measured and processed.

The intensity of the light 3.3 generated by photo-luminescence at the impinging light spot 3.2 in the optical waveguide 1 decreases with increasing distance from the light spot 3.2. For geometrical reasons, the intensity decreases proportionally to the reciprocal of the distance. A further, exponential decrease in intensity therefore occurs because the light guiding in the waveguide is beset by losses.

The intensity of the light 3.3 in the waveguide depending on the distance r from the point of impingement of a light spot 3.2, that is to say from the point at which the luminescence takes place, can thus be described by the following formula:

$$I = I_0 * \exp(-k.r)/r$$

In this case, k is a material parameter and the initial intensity $I_0$ is dependent on the energy of the introduced light beam 3.1.

Thus, the strength of the electrical signal generated at the individual photodetectors on account of detected light is also dependent on the distance between the individual photodetectors and the point of impingement of a light spot 3.2.

If a plurality of photodetectors are connected to a planar optical waveguide, then different intensities of the light in the waveguide mode are measured at said photodetectors, the measurement results being dependent on how far away the measuring photodetector is from the point of impingement of the luminescence-generating light spot. From the ratio of the measured signal strengths at the individual photodetectors, data-technologically automatable mathematical methods can be used to deduce the more precise impingement position of the luminescence-initiating light beam on the detector surface.

FIG. 2 serves to illustrate an algorithm which is suitable for this purpose, said algorithm being roughly outlined below:

Assuming an initial intensity $I_0$ that is identical for all the photodetectors considered, depending on the results measured at the individual photodetectors, it is possible to calculate for the individual photo-detectors on which circular line all around the relevant photodetector the point of impingement of the light spot to be localized would have to lie. The corresponding circles with regard to three photo-detectors are depicted by dashed lines by way of example in FIG. 2. The circles have a total of six points of intersection A, B, C, a, b, c.

For the calculation, the initial intensity $I_0$ valid for all three photodetectors is then increased or decreased until the three inner points of intersection a, b, c in accordance with FIG. 2 coincide on a single point of intersection. The center of the impinging light spot lies precisely at this "triple point of intersection" found in this way.

If the distances between the individual photodetectors are not greater than a few cm, the loss-induced exponential decrease in the intensity of the light guided in the waveguide is insignificant relative to the geometry-governed decrease in the intensity. The abovementioned formula can then be approximated sufficiently well by the formula $$I=I_0/r$$

This means that the calculation can be simplified and the algorithm described can be run through more rapidly.

At the operating speed of the data processing systems nowadays available in large numbers cost-effectively and without any problems, however, the more exact calculation in accordance with the former formula is also possible in such a fast time that the perception of a real-time measurement is afforded with regard to the rapidity of ascertaining the location of an impinging light spot.

Depending on the surface area and required resolution, as many photodetectors as desired can be mounted, preferably in a regular pattern, on the detector surface.

The more densely the photodetectors are mounted, the greater the minimum signal strength and, accordingly, the resolution of the component for the same read-out electronics. In experiments with an optimized waveguide based on a plastic plate doped with dyes, it was possible to achieve an accuracy to better than +/−1 mm given a spacing of the photodetectors of 12 cm in a square pattern.

For mounting the photodetectors on the optical waveguide, an adhesive should be used which, in the cured state, produces a good optical contact between waveguide and photodetector. The "good optical contact" is produced when the cured adhesive is transparent to the light in the waveguide mode and when its refractive index is between the refractive index of the waveguide 1 (that is to say of the layer 1.1) and the refractive index in the adjoining part of the photodetector. (The smaller the difference in the refractive indices of adjoining materials, the better light is guided through the boundary layer between the two materials.)

FIG. 3 illustrates a typical construction of a photo-detector 2 and an advantageous arrangement on an optical waveguide 1.

The photodetector 2 consists of a photoelectric element 2.1, typically a piece of silicon wafer, which, from an electrical standpoint, constitutes a photodiode or a phototransistor. One side of said element 2.1 is connected to one side of a typically ceramic base lamina 2.2 and electrically contact-connected to electrical conductors arranged there. The electrical contact is led further via electrical lines 2.4 that lead away and are likewise connected to the base lamina 2.2. Said lines can typically be formed by wires or a layer on a flexible circuit board.

The light-sensitive side of the photoelectric element 2.1 is enclosed by a transparent "window" 2.3. This window, which typically consists of a transparent plastic, is connected to the optical waveguide 1 by adhesive bonding.

In the advantageous embodiment illustrated in FIG. 3, a depression 1.3 is embossed into the optical waveguide 1 at the location of adhesive bonding to the photo-detector, the inner contour of said depression being identical to the outer contour of the window 2.3. The window 2.3 is inserted into said depression 1.3 and adhesively bonded thereto.

As a result of this geometrical embodiment of the connection surface between the photodetector 2 and the waveguide 1, significant advantages are afforded by comparison with an arrangement of a photodetector on a flat, non-deformed region of the waveguide. The connection is significantly more robust mechanically, the assembly can be handled better, since the photodetector projects less, and the optical connection between waveguide and photodetector is better.

Typically, the cross-sectional dimensions of a window 2.3 of a photodetector 2 in the plane of the waveguide are approximately 2 by 2 mm$^2$ and the height perpendicular thereto is in this case approximately 0.5 mm. It has been found that the matching depression 1.3 in the waveguide 1 can be produced without any problems by embossing if the waveguide, as defined according to the invention, is formed from a polymer having a layer thickness of 20 to 500 μm.

In accordance with FIG. 4, a photodetector 2 can also be fixed to a waveguide 1 by an opening being stamped out at the waveguide, said opening having exactly the cross-sectional contour of the window 2.3 of the photo-detector 2, the window being inserted through said opening and the cut surface of the opening in the waveguide being adhesively bonded to the window 2.3. The arrangement is particularly flat.

It should be mentioned that it is also possible to produce a photodetector by a printing or vapor deposition method directly on the surface of the waveguide.

The luminous pointer 4, visible in FIG. 1, can be a laser, which can be part of a firearm simulation device, and emits a frequency-modulated, green laser beam 3.1 having a wavelength of 532 nm onto the detector surface, where luminescence is thereby initiated in the manner already discussed, longer-wave light that arises as a result is guided in the waveguide 1 and an electrical signal is generated by said light in the photodetectors 2. Said electrical signal can be forwarded to the data processing system 7 via lines 5 and, if necessary, an intermediate switching device 6, which can contain a frequency filter and/or interface electronic circuit.

A detector surface according to the invention can be fitted as a flexible layer on clothing for a person. If the laser 4 emits a light pulse onto said detector surface, then the coordinates of that point on the detector surface at which the light pulse 3.1 from the laser 4 impinges on the indication surface can be identified by the data processing system 7 by virtue of the latter calculating said coordinates from the signals of the plurality of photodetectors for example by means of the algorithm outlined further above.

The detector surface described can also be produced cost-effectively in a large-area embodiment. It can be constructed in its entirety from largely transparent materials. Dyes that absorb only at the edges of or outside the visible light spectrum are necessary for this purpose.

Since, by way of example, the selection of the photo-luminescent particles in the layer 1.2 enables the setting that only a specific, narrow spectrum of incident light actually initiates luminescence, and by virtue of the use of a light pointer 4 which is intensely luminous precisely in this spectral range, the device can be made insensitive to ambient light very well.

It is also possible for light having a temporally frequency-modulated intensity to be emitted by the light pointer 4. In other words, the intensity of the beam 3.1 fluctuates temporally with a specific frequency. This frequency is filtered out of the signals supplied by the photodetectors 2 using means appertaining to telecommunication technology. By virtue of the fact that differently frequency-coated laser beams are used, the application of frequency filters makes it possible to distinguish a plurality of simultaneously impinging laser beams and to identify the respective impingement positions thereof on the detector surface.

Ambient light can also be filtered out by a layer which is fitted on the detector surface and which only transmits light in a specific spectral range.

In one advantageous further development, the photo-detectors present on the detector surface can be used for generating electrical energy, which is utilized e.g. for the read-out electronics and wireless data transmission.

It should supplementarily also be emphasized that the light beam 3.1 need not necessarily be a laser beam. It is merely the case that when the light beam 3.1 is a laser beam, particularly advantageous conditions arise since the properties of the light beam can thus be determined very exactly and the detection is possible in a simple manner even at very large distances from the light source.

The application for simulating firearms is optimally combined with the linking of the detector surface to a mobile telecommunication device which performs the hit evaluation and indicates a hit by means of acoustic and/or optical signals. Furthermore, the telecommunication device can establish a wireless electronic connection to a data processing device in order to reproduce an evaluation of the events on a screen or over the Internet.

A further advantageous application is the mounting of the detector surfaces on surfaces in and on buildings, in order to use them as switches for various devices such as e.g. lighting, shading devices, automatic gates and doors or electronic devices. These can be activated remotely using a light pointer. The advantage is that a single light pointer can be utilized as a universal remote control for a multiplicity of applications. By virtue of the arrangement of detector surfaces on specific devices or on specific surface regions or parts of devices, it is possible to create a simple and clearly comprehensible assignment as to what application is switched in what way or what application is intended to be affected by the switching or by what means information is intended to be retrieved by the switching.

By means of a temporal modulation specific to each luminous pointer, a serial number of the luminous pointer can be transmitted in a digitally coded manner. The signal emitted by the detector surface then contains not only information about the point of impingement of a light spot, but also alphanumeric information that makes it possible to identify from which luminous pointer the relevant light spot originates. An electronic device that is connected downstream of the detector surface and processes the signal thereof can be programmed in such a way that it can read these numbers and only allows signals to be processed further which originate from one or more very specific luminous pointers which can be identified by the specific serial numbers thereof. The switching of the associated device can then only be initiated by these specific luminous pointers. Consequently, the luminous pointer simultaneously serves as key and as remote control.

Hitherto, such functions have usually been achieved by means of radio transmission or nondirectional infrared transmission, which has the consequence that a different key on the input device has to be allocated for each device and each function and that the signal can be intercepted in order to decode the encryption and to be able to utilize the device without authorization.

The direct light transmission in the present case means that undesirable interception of the signal is virtually impossible, since the signal is transmitted only in one direction.

Moreover, the device to be controlled is targeted by the user; therefore, the need to provide keys on the remote control for all devices and functions is obviated.

Of course, on a pointing device as well it is possible to provide a plurality of keys that can trigger luminous pointers that are coded differently from one another. Thus, different functions to be switched can be assigned to individual surface regions of a detector surface, depending on which key of a pointing device triggered the light pointer striking the surface region.

The invention claimed is:

1. A detector surface for optical signals which is constructed from one or a plurality of planar layers and which is arranged as a flexible enveloping surface around or on a body in order to detect whether and/or where a luminescence-generating light spot strikes the body, wherein the detector surface is constructed from one or a plurality of planar optical waveguides, wherein at least one layer of the planar optical waveguides has photoluminescent properties, and wherein a planar optical waveguide is connected to at least one photodetector via a light-transmissive contact surface,
wherein the planar optical waveguide is formed as a film composed of a transparent polymer having a thickness of 20 to 500 μm, and in that at least one of the photodetectors is arranged on the optical waveguide at a distance from all edges of the optical waveguide in order to sense the photoluminescent light in the optical wave guide generated when the luminescence-generating light spot strikes the detector surface.

2. The detector surface as claimed in claim 1, wherein it is constructed from a plurality of geometrically mutually adjoining partial surfaces from optical waveguides which are separated from one another with regard to the optical waveguiding, and wherein at least one photodetector is arranged on each optical waveguide.

3. The detector surface as claimed in claim 1, wherein at least one optical waveguide is provided with a plurality of photodetectors arranged at a distance from one another.

4. The detector surface as claimed in claim 1, wherein a photodetector is adhesively bonded into a depression of an optical waveguide.

5. The detector surface as claimed in claim 1, wherein a photodetector is inserted into an opening in an optical waveguide and is adhesively bonded to the edges of the opening.

6. The detector surface as claimed in claim 1, wherein the photodetectors are produced by printing or evaporation methods directly on the surface of the waveguide.

7. The detector surface as claimed in claim 1, wherein a frequency filter is connected downstream of the photo detectors.

8. The detector surface as claimed in claim 1, wherein it is part of the clothing of a person.

9. The detector surface as claimed in claim 1, wherein it is used as a switch for a device which can be operated remotely by means of a light pointer.

10. The detector surface as claimed in claim 9, wherein the device switched by the switch is the object itself around or on which the detector surface is arranged.

11. The detector surface as claimed in claim 9, wherein the device switched by the switch acts on that object and/or information is generated and/or forwarded about that object around or on which the detector surface is arranged.

12. The detector surface as claimed in claim 9, wherein it is used in combination with a luminous pointer which transmits a temporally modulated light signal that is characteristic of said pointer, and in that there is connected downstream of the detector surface a device which is able to carry out the processing of the modulated signal that passes to it from the detector surface in a manner dependent on what information is coded in the modulation.

* * * * *